United States Patent
Lifka

(10) Patent No.: US 11,059,268 B2
(45) Date of Patent: Jul. 13, 2021

(54) ADAPTER COMPONENT, METHOD FOR PRODUCING AN ADAPTER COMPONENT AND CONNECTION ASSEMBLY HAVING AN ADAPTER COMPONENT

(71) Applicant: Bayerische Motoren Werke Aktiengesellschaft, Munich (DE)

(72) Inventor: Carsten Lifka, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 66 days.

(21) Appl. No.: 16/377,574

(22) Filed: Apr. 8, 2019

(65) Prior Publication Data

US 2019/0232615 A1 Aug. 1, 2019

Related U.S. Application Data

(63) Continuation of application No. PCT/EP2017/077043, filed on Oct. 24, 2017.

(30) Foreign Application Priority Data

Nov. 24, 2016 (DE) ..................... 10 2016 223 263.0

(51) Int. Cl.
 *B32B 15/01* (2006.01)
 *C22C 21/02* (2006.01)
 (Continued)

(52) U.S. Cl.
 CPC .......... *B32B 15/012* (2013.01); *B32B 15/013* (2013.01); *C22C 21/00* (2013.01);
 (Continued)

(58) Field of Classification Search
 None
 See application file for complete search history.

(56) References Cited

U.S. PATENT DOCUMENTS 3,479,730 A 11/1969 Poth
4,202,709 A 5/1980 Shibamori et al.
(Continued)

FOREIGN PATENT DOCUMENTS

CN 104843086 A 8/2015
DE 29 09 418 A1 9/1979
(Continued)

OTHER PUBLICATIONS

English translation of Chinese-language Office Action issued in Chinese Application No. 201780057749.1 dated Apr. 14, 2020 with (eight (8) pages).

(Continued)

*Primary Examiner* — Daniel J. Schleis
(74) *Attorney, Agent, or Firm* — Crowell & Moring LLP

(57) ABSTRACT

An adapter component connects two components. The adapter component has a main body formed by a shaped multi-layer sheet, wherein the multi-layer sheet has at least one steel load-transmission layer, an intermediate binder layer and a light metal load-transmission layer. The intermediate binder layer is arranged between the steel load-transmission layer and the light metal load-transmission layer. In addition, the intermediate binder layer and the light metal load-transmission layer include a light metal, wherein the light metal load-transmission layer has a greater mechanical stability than the intermediate binder layer.

16 Claims, 2 Drawing Sheets

(51) Int. Cl.
*C22C 21/06* (2006.01)
*C22C 21/00* (2006.01)

(52) U.S. Cl.
CPC .............. *C22C 21/02* (2013.01); *C22C 21/06* (2013.01); *Y10T 428/12757* (2015.01); *Y10T 428/12764* (2015.01)

(56) References Cited

U.S. PATENT DOCUMENTS

| | | | |
|---|---|---|---|
| 2008/0170906 | A1 | 7/2008 | Schmidt |
| 2008/0268279 | A1 | 10/2008 | Want |
| 2015/0232129 | A1 | 8/2015 | Grundmeier |
| 2016/0200369 | A1 | 7/2016 | Ruess et al. |

FOREIGN PATENT DOCUMENTS

| | | | |
|---|---|---|---|
| DE | 37 39 300 C1 | | 4/1989 |
| DE | 3739300 | * | 4/1989 |
| DE | 197 46 165 A1 | | 4/1999 |
| DE | 199 39 977 A1 | | 3/2001 |
| DE | 101 55 104 A1 | | 5/2003 |
| DE | 10 2004 034 817 A1 | | 2/2006 |
| DE | 10 2006 014 988 A1 | | 10/2007 |
| DE | 10 2015 100 263 B3 | | 3/2016 |

OTHER PUBLICATIONS

International Search Report (PCT/ISA/210) issued in PCT Application No. PCT/EP2017/077043 dated Feb. 9, 2018 with English translation (seven (7) pages).

German-language Written Opinion (PCT/ISA/237) issued in PCT Application No. PCT/EP2017/077043 dated Feb. 9, 2018 (seven (7) pages).

German-language Search Report issued in counterpart German Application No. 10 2016 223 263.0 dated Oct. 20, 2017 with partial English translation (12 pages).

* cited by examiner

ADAPTER COMPONENT, METHOD FOR PRODUCING AN ADAPTER COMPONENT AND CONNECTION ASSEMBLY HAVING AN ADAPTER COMPONENT

CROSS REFERENCE TO RELATED APPLICATIONS

This application is a continuation of PCT International Application No. PCT/EP2017/077043, filed Oct. 24, 2017, which claims priority under 35 U.S.C. § 119 from German Patent Application No. 10 2016 223 263.0, filed Nov. 24, 2016, the entire disclosures of which are herein expressly incorporated by reference.

BACKGROUND AND SUMMARY OF THE INVENTION

The present invention relates to an adapter component, in particular to an adapter component for dynamically highly loaded structures, and to a method for producing an adapter component. The adapter component can be used for example for joining two components of a structural vehicle component. Furthermore, the invention relates to a connection assembly having an adapter component.

The publication DE 10 2004 034 817 A1 describes an adapter for joining two components consisting of different materials, wherein the adapter has a main element consisting of a first material, which is non-detachably, non-positively and positively joined with a connecting element consisting of the second material by way of a joining operation. Because of this, connecting a component consisting of a first material to a structural element consisting of a second material is possible. For this purpose, the main element can be embodied for example as a plate, the connecting element as a plate or T-profile section. The materials can be for example a steel material or an aluminum material.

However, in particular because of the very soft aluminum, the adapter is not suited for use in dynamically highly loaded structures, such as for example in the case of an axle support. The high concentricity precision (calibration) required for subsequent processing can be partly achieved by means of a sphere, which is pressed through the tube adapter. However, this type of calibration is uneconomical and does not increase the concentricity precision to the desired degree.

It is therefore at least one object of the present invention to provide an adapter component for dynamically highly loaded structures. Preferentially, the adapter component has a high concentricity precision. Further objects include providing a method for producing an adapter component and a connection assembly having the adapter component.

The adapter component described here is preferably designed for joining two components or two assemblies. For example, the two components can have different materials or consist of different materials. The adapter component can be designed in particular for joining a steel component or a steel assembly and a light metal component or a light metal assembly. Furthermore, the adapter component here and in the following can also be referred to as hybrid adapter.

The adapter component has a main body formed from an unformed multi-layer sheet. The multi-layer sheet has at least one steel load transmission layer, an intermediate binding layer and a light metal load transmission layer, wherein the intermediate binding layer is arranged between the steel load transmission layer and the light metal load transmission layer. Preferably, the intermediate binding layer and the light metal load transmission layer have a light metal, wherein the light metal load transmission layer has a greater mechanical stability than the intermediate binding layer.

In the following, the multi-layer sheet, of which the main body of the adapter component is formed, is discussed initially. Following this, the adapter component or the manufacture of the adapter component starting out from the multi-layer sheet is described.

A multi-layer sheet within the scope of the invention is understood to mean a strip or plate-shaped multi-layer object having a sheet thickness and a sheet width. In the case of a plate-shaped form of the multi-layer sheet, a sheet length is defined or definable, in the case of a strip-shaped form of the multi-layer sheet a sheet length is referred to as endless. The multi-layer sheet has at least one steel load transmission layer, at least one intermediate binding layer and at least one light metal load transmission layer. Particularly preferably, the multi-layer sheet has exactly one steel load transmission layer and exactly one light metal load transmission layer, wherein the multi-layer sheet can have one or more intermediate binding layers, of which a first intermediate binding layer, which forms a particularly good bond with the steel load transmission layer is arranged on the steel transmission layer and a second intermediate binding layer, which forms a particularly good bond with the light metal load transmission layer, is arranged on the light metal load transmission layer. In particular preferably, the multi-layer sheet has exactly one intermediate binding layer, which is designed for forming a good bond with the steel load transmission layer and also the light metal load transmission layer.

The steel load transmission layer preferentially has an alloy composition, in particular a ductility, which favors a manufacture of the multi-layer sheet by roll cladding. In addition to this, the steel load transmission layer preferentially has such a strength that a secure joining of two components of a vehicle structure via an adapter component produced from the multi-layer sheet can be ensured, which withstands mechanical loads during the operation of the vehicle.

The light metal load transmission layer has a light metal. In the light metal load transmission layer, the light metal is preferentially present in such a concentration that a welding of the light metal load transmission layer to a light metal component of the same light metal is ensured. The light metal load transmission layer preferentially has an alloy composition, in particular a ductility, which favors a manufacture of the multi-layer sheet by roll cladding. In addition to this, the light metal load transmission layer preferentially has such a strength that a secure joining of two components of a vehicle structure via an adapter component produced from the multi-layer sheet can be ensured, which withstands mechanical loads during the operation of the vehicle. The steel load transmission layer and light metal load transmission layer are preferentially designed so as to only form an inadequate bond with one another by roll cladding, when no intermediate binding layer were to be present.

The intermediate binding layer is therefore designed for providing a secure bond between the steel load transmission layer and the light metal load transmission layer, which is preferentially achievable by roll cladding. For this purpose, the intermediate binding layer likewise has a light metal, preferentially the same light metal as the light metal load transmission layer, in order to improve a bond with the light metal load transmission layer. The intermediate binding layer preferentially has an alloy composition, in particular a ductility, which favors a manufacture of the multi-layer sheet by roll cladding. In addition to this, the intermediate binding layer preferentially has such a strength that a secure joining of two components of a vehicle structure via an adapter component produced from the multi-layer sheet can be ensured, which withstands mechanical loads during the operation of the vehicle.

Preferentially, the light metal load transmission layer has a higher mechanical stability, such as for example yield limit, tensile strength and/or hardness, than the intermediate binding layer.

Compared with known multi-layer sheets a multi-layer sheet has the advantage that the same is particularly suited for establishing a connection between a steel component and a light metal component, which is designed for withstanding high dynamic loads. For this reason, the multi-layer sheet is particularly suited for use in vehicle structures of motor vehicles in light-weight construction in order to ensure a secure and heavy duty joining of light metal components and steel components with simple means and cost-effectively.

According to a further embodiment, it can be provided with the multi-layer sheet that the light metal load transmission layer has an aluminum alloy (Al-alloy), in particular a higher-strength Al-alloy, which for example has at least the strength of ENAW5754. An Al-alloy has the advantage that aluminum components for a vehicle structure can be reliably joined with steel components of the vehicle structure via an adapter component produced from the multi-layer sheet. Because of the low density of aluminum, aluminum components are particularly well suited for saving weight in vehicles. A higher-strength Al-alloy has the advantage that a capacity to withstand stress of the multi-layer sheet, in particular of an adapter component produced from the multi-layer sheet is improved. This is advantageous in particular when used in a vehicle structure of a vehicle, since because of this a load capacity of the vehicle structure can be improved and wear of the vehicle structure, in particular an increase of the operational stability or of the fatigue strength of the vehicle structure can be reduced.

According to a further embodiment, the light metal load transmission layer can have an $AlMg_3$ alloy or consist of an $AlMg_3$ alloy. $AlMg_3$ is also referred to as ENAW5754. An $AlMg_3$ alloy has a particularly high capacity to withstand mechanical stress and is thus particularly suitable for producing a heavy duty vehicle structure.

It is preferred that the intermediate binding layer has modified Al99 or consists of modified Al99. Al99 is also referred to as ENAW1200. The Al99 is preferentially modified in such a manner that a joining with the steel load transmission layer and/or the light metal load transmission layer, in particular a joining achieved by roll cladding, is improved. The modified Al99 preferentially has a finer structural forming than conventional Al99. A multi-layer sheet having such an intermediate binding layer is particularly suitable for heavy duty adapter components because of advantageous mechanical properties.

Preferentially, the steel load transmission layer has a special quality steel or consists of a special quality steel. A special quality steel within the scope of the invention is a steel which has an adequate mechanical stability in order to withstand high dynamic loads as they occur in an adapter component of a vehicle structure. Furthermore, the special quality steel has a higher strength with preferentially improved plastic deformability than a conventional steel. Preferentially, the special quality steel has an improved joining quality with the intermediate binding layer. By way of this, the special quality steel is particularly suitable for producing the multi-layer sheet by roll cladding.

It is preferred, furthermore, that the light metal load transmission layer has a silicon content of less than 20% by weight, in particular of less than 5% by weight. A preferred minimum silicon content of the light metal load transmission layer is 0.3% by weight. Preferentially, the silicon content of the light metal load transmission layer is approximately 0.4% by weight. Such light metal load transmission layers with a relatively low silicon content have the advantage of a particularly high strength and/or fatigue strength, in particular a low mechanical embrittlement.

According to a preferred configuration of a multi-layer sheet described here, the steel load transmission layer has a steel layer thickness between 0.8 and 2.3 mm and/or the intermediate binding layer together with the light metal load transmission layer has a layer thickness sum between 2.0 and 7.0 mm, preferentially between 2.0 and 5.0 mm, in particular between 2.0 and 2.9 mm. Here it is preferred that the steel load transmission layer has a steel layer thickness between 0.8 and 2.3 mm and the intermediate binding layer together with the light metal load transmission layer has a layer thickness sum between 2.0 and 2.9 mm. The layer thickness sum is a sum of an intermediate layer thickness of the intermediate binding layer and a load layer thickness of the light metal load transmission layer. Such steel layer thicknesses or layer thickness sums have the advantage that these can be reliably produced by means of a roll cladding method with simple means, so that an adequate joining of the steel load transmission layer with the intermediate binding layer and the intermediate binding layer with the light metal load transmission layer is ensured.

Further preferably, a load layer thickness of the light metal load transmission layer is at least twice as thick as an intermediate layer thickness of the intermediate binding layer. By way of a relatively thin intermediate binding layer and a relatively thick light metal load transmission layer a strength of the multi-layer sheet can be improved. Here it is preferred that the intermediate layer thickness has at least a minimum layer thickness of 0.2 mm. Thus, a dynamic load capacity of a vehicle structure for example, which has at least one adapter component produced from such a multi-layer sheet, can be improved.

According to a further embodiment, the main body of the adapter component substantially has the shape of a hollow cylinder. For example, for producing the main body, the multi-layer sheet can be formed in such a manner that the multi-layer sheet following the forming process forms a body having a substantially tubular shape or a hollow cylindrical shape. The multi-layer sheet can be formed for example in such a manner that the steel load transmission layer is arranged in the interior of the hollow cylindrical main body and the light metal load transmission layer forms the outer surface of the hollow cylindrical main body. Alternatively, the multi-layer sheet can be formed for example in such a manner that the light metal load transmission layer is arranged in the interior of the hollow cylindrical main body and the steel load transmission layer forms the outer surface of the hollow cylindrical main body.

According to a further embodiment, the steel load transmission layer is not covered in a part section adjoining a first opening region of the hollow cylindrical main body by the intermediate binding layer and/or not covered by the light metal load transmission layer. For example, this part section of the main body, which adjoins the first opening region, can be merely formed by the steel load transmission layer. The intermediate binding layer and/or the light metal load transmission layer could have been removed in this region for example by chip machining or by eroding, so that an aluminum-free end section for welding to a steel component is available. Since very high temperatures are used during the welding of steel, an aluminum layer arranged in this region would melt and flow into the steel melt puddle, as a result of which brittle intermetallic phases would be formed which would lower the bond strength between the adapter component and the steel component.

According to a further embodiment, the intermediate binding layer and/or the light metal load transmission layer are not covered in a part section adjoining a second opening region of the hollow cylindrical main body by the steel load transmission layer. The second opening region can be formed for example at an end of the hollow cylindrical main body that is located opposite the first opening region. This region can be designed in particular for welding the adapter component to a light metal component or aluminum component. Advantageously, a tearing-open of the weld seam in the case of structures that are subjected to high dynamic loads can be prevented. The steel load transmission layer could have been removed in the part section adjoining the second opening region, for example by chip machining.

According to a further embodiment, the steel load transmission layer has a layer thickness, wherein starting out from the first opening region the layer thickness decreases in the direction of the second opening region. For example, the steel load transmission layer can have a constant layer thickness in a first section, which extends for example from the first opening region in the direction of the second opening region and in a second section adjoining the first section, can have a layer thickness that continuously decreases in the direction of the second opening region. Because of this, a stiffness jump can be advantageously prevented by configuring the transition from steel to aluminum.

The adapter component described here has the advantage compared with known adapter components for example that the same is particularly suited for producing a connection between a steel component and a light metal component, which is designed for withstanding high dynamic loads. For this reason, the adapter component is particularly suited for use in vehicle structures of motor vehicles in light-weight construction, in order to ensure a secure and heavy duty connection of light metal components and steel components with simple means and cost-effectively.

Furthermore, a connection assembly is stated which has a first component consisting of a first material, a second component consisting of a second material and an adapter component described here. The adapter component can have one or more features of the aforementioned embodiments. The first component and the second component are preferentially joined by means of the adapter component. The first component can for example be a steel component. The second component can for example be formed as a light metal component, such as for example an aluminum component. Here, the steel load transmission layer of the adapter component is preferentially joined with the steel component and the light metal load transmission layer of the adapter component is preferentially joined with the light metal component or to the aluminum component. In particular, the steel component can be welded to the steel load transmission layer and the light metal load transmission layer can be joined with the light metal component by a thermal joining method, such as for example a welding method.

Furthermore, a method for producing an adapter component described here is stated. The adapter component described above is producible or is produced in particular by the method. Thus, the features described above and in the following can apply both to the adapter component and also to the method for producing the adapter component.

With the method, a multi-layer sheet, which has a steel load transmission layer, a light metal load transmission layer and an intermediate binding layer arranged between the steel load transmission layer and the light metal load transmission layer is preferentially produced. Following this, the multi-layer sheet is formed into a hollow cylindrical main body. For example, the multi-layer sheet can be formed in such a manner that the steel load transmission layer is arranged in the interior of the hollow cylindrical main body and the light metal load transmission layer is arranged on the outside. Alternatively, the multi-layer sheet can be formed in such a manner that the light metal load transmission layer is arranged inside and the steel load transmission layer is arranged on the outside.

According to a further embodiment, a seam, which is defined by two ends of the multi-layer sheet brought together by the forming is closed after the forming of the multi-layer sheet by a joining method. Alternatively, the seam can be left open, i.e. not closed.

According to a further embodiment, part sections of the light metal load transmission layer and/or the intermediate binding layer adjoining a first opening region of the hollow cylindrical main body are removed. Preferentially, these part sections are completely removed so that the adapter component, in a region adjoining the first opening region, is merely formed by the steel load transmission layer. Because of this, an aluminum-free end region for welding the adapter component to a steel component can be advantageously provided. The removing can be carried out for example by chip machining or by eroding.

According to a further embodiment, a part section of the steel load transmission layer adjoining a second opening region of the hollow cylindrical main body is removed for example by chip machining or by eroding. The second opening region is preferentially located on a side of the adapter component located opposite the first opening region. Preferentially, at least one part section of the steel load transmission layer is completely removed so that a steel-free end region for welding the adapter component to a light metal component can be made available.

Furthermore, the steel load transmission layer can be removed in such a manner that the layer thickness of the steel load transmission layer decreases in the direction of the second opening region.

According to a further embodiment, the multi-layer sheet and/or the hollow cylindrical main body are formed by means of electromagnetic pulse technology (EMPT, electromagnetic pulse technology). The forming by way of electromagnetic pulse technology can be carried out for example during and/or after the forming of the sheet to form the hollow cylindrical main body described above. Because of this, the concentricity precision of the adapter component can be advantageously increased.

Other objects, advantages and novel features of the present invention will become apparent from the following detailed description of one or more preferred embodiments when considered in conjunction with the accompanying drawings.

DETAILED DESCRIPTION OF THE DRAWINGS

In the exemplary embodiments and figures, same component parts or component parts having the same function are marked with the same reference numbers in each case. The shown elements and their size ratios among them must not generally be considered to scale. On the contrary, for the improved presentation and/or for the improved understanding, individual elements can be shown with exaggeratedly large dimensions.

Figure 1:
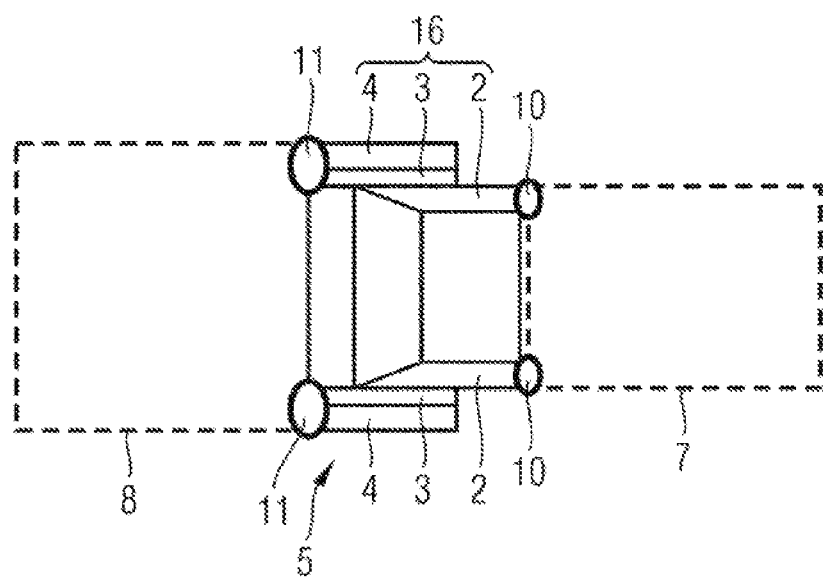
FIG. 1 is a schematic representation of an adapter component for joining two components according to an exemplary embodiment.

FIG. 1 shows a schematic representation of an adapter component 5 for joining a steel component 7 and a light metal component 8. The adapter component 5 has a main body 16 formed by a shaped multi-layer sheet, which has a steel load transmission layer 2, an intermediate binding layer 3 and a light metal load transmission layer 4. The main body 16 has a hollow cylindrical shape. The intermediate binding layer 3 and the light metal load transmission layer 4 preferentially have a light metal, and the light metal load transmission layer 4 preferentially has a greater mechanical stability than the intermediate binding layer 3.

The steel load transmission layer 2 is covered in a part section adjoining a first opening region of the hollow cylindrical main body 16 neither by the intermediate binding layer 3 nor by the light metal load transmission layer 4. Because of this, an aluminum-free end region for welding the adapter component 5 to a steel component 7 can be provided. The steel component 7 can be welded to the steel load transmission layer 2 of the adapter component 5 via a steel weld seam 10 and thus fixed to the adapter component 5.

In a part section adjoining a second opening region of the hollow cylindrical main body 16, the intermediate binding layer 3 is not covered by the steel load transmission layer 2. Because of this, a steel-free end region for welding the adapter component 5 to a light metal component 8 can be made available. Furthermore, the layer thickness of the steel load transmission layer 2 decreases in the direction of the second opening region. A light metal component 8, which can be designed for example as an aluminum component, can be welded to the light metal load transmission layer 4 of the adapter component 5 via a light metal weld seam 11, which is preferentially formed as an aluminum weld seam, and thus be likewise fixed to the adapter component 5.

Figure 2:
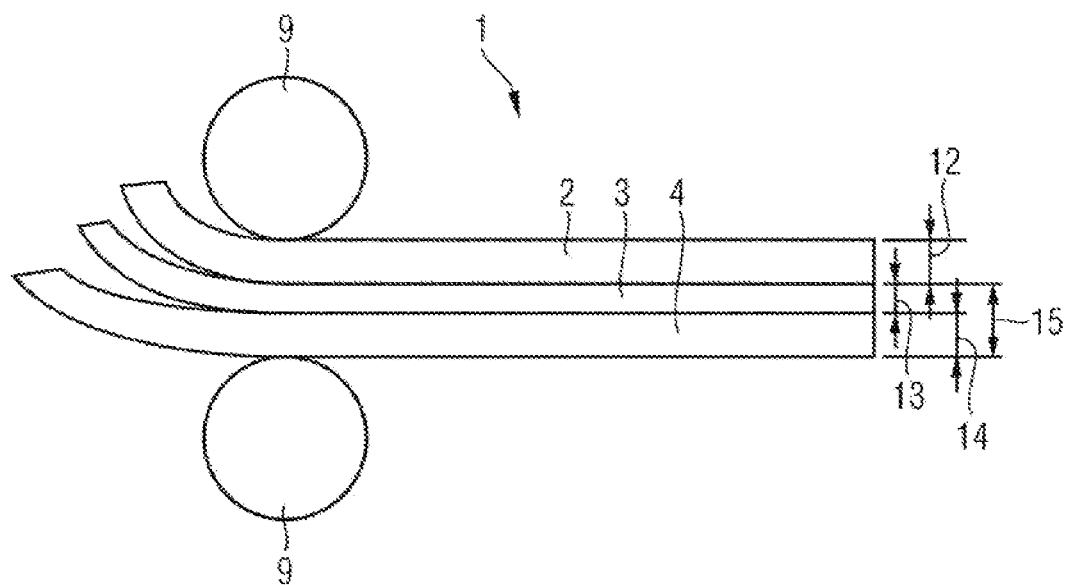
FIG. 2 is a schematic representation of a method for producing an adapter component described here according to an exemplary embodiment.

In FIG. 2, a production process of a multi-layer sheet 1 for producing an adapter component 5 is schematically shown in a lateral view. The multi-layer sheet 1 has a steel load transmission layer 2, an intermediate binding layer 3 and a light metal load transmission layer 4, wherein the intermediate binding layer 3 is arranged between the steel load transmission layer 2 and the light metal load transmission layer 4. During the manufacture of the multi-layer sheet 1, the steel load transmission layer 2, intermediate binding layer 3 and light metal load transmission layer 4 are passed through between two rolls 9 and pressed together in a roll cladding method under high pressure or high pressure and temperature inflow. In addition, a subsequent heat treatment following the pressing can be provided. Thus, a strong bond of the steel load transmission layer 2, intermediate binding layer 3 and light metal load transmission layer 4 is achieved. The steel load transmission layer 2 has a steel layer thickness 12, the intermediate binding layer 3, an intermediate layer thickness 13 and the light metal load transmission layer 4 a load layer thickness 14. The sum of intermediate layer thickness 13 and load layer thickness 14 is referred to as layer thickness sum 15.

Figure 3:
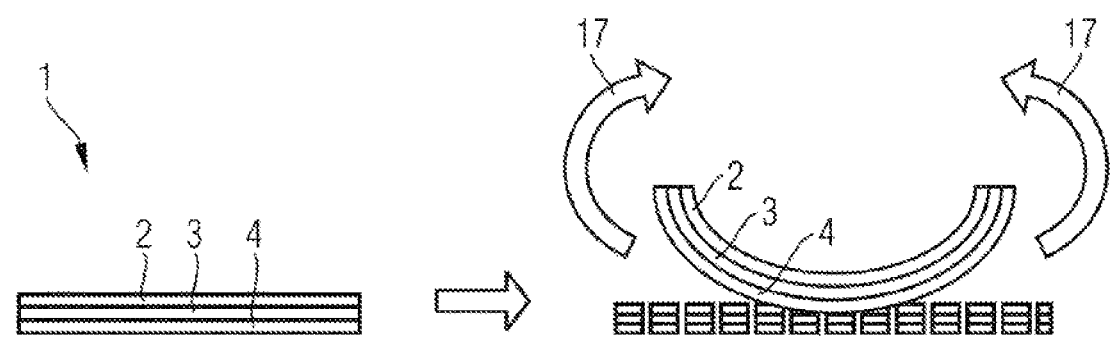
FIG. 3 is a schematic representation of a method for producing an adapter component described here according to an exemplary embodiment.

In a schematic representation, FIG. 3 shows how a multi-layer sheet 1, which can be produced for example as described in connection with FIG. 2, is formed into a hollow cylindrical main body by a forming process 17. In the exemplary embodiment according to FIG. 3, the multi-layer sheet 1 is formed in such a manner that the steel load transmission layer 2 is arranged in the interior of the main body and the light metal load transmission layer 4 is arranged on the outside. Alternatively, the multi-layer sheet for producing an adapter component 5 can also be formed in such a manner that the steel load transmission layer is arranged on the outside and the light metal load transmission layer 4 on the inside.

Figure 4:
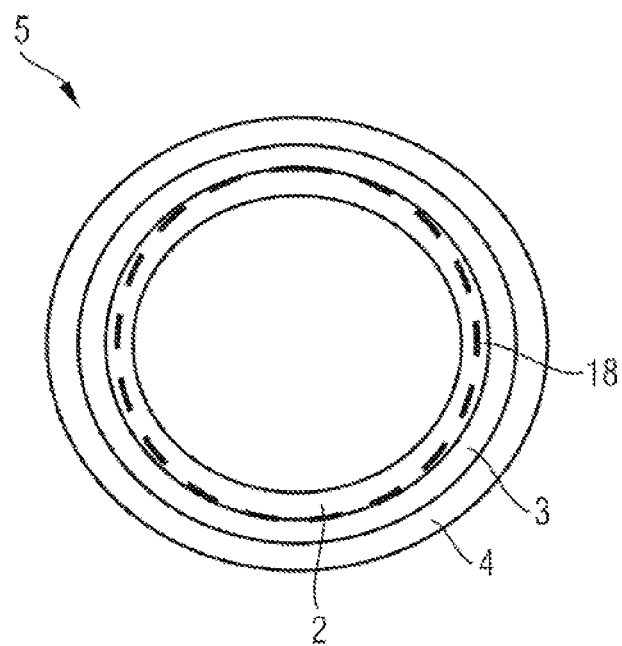
FIG. 4 is a schematic representation of a method for producing an adapter component described here according to an exemplary embodiment.

FIG. 4 shows a plan view in the direction of a longitudinal axis of the hollow cylindrical main body of the adapter component 5. For an exact removal of the steel load transmission layer 2 or an exact removal of the light metal load transmission layer 4 in regions by chip machining 18, a high concentricity precision of the adapter component 5 is required. Since the same however is often not adequately present following the forming process of the multi-layer sheet 1 to form the hollow cylindrical adapter component 5, there is the risk for example that during a chip machining 18 for removing a part region of the light metal load transmission layer 4 and the intermediate binding layer 3, a part of the steel load transmission layer 2 is also removed, as a result of which the load capacity of the adapter component 5 would be reduced. For this reason, the hollow cylindrical main body 16 is preferentially formed by way of electromagnetic pulse technology for increasing the concentricity precision of the adapter component 5.

The adapter component 5 described here advantageously makes a use possible in structures that are subjected to high dynamic loads. Furthermore, the adapter component 5 is characterized by low production costs and a low weight.

The features described in the shown exemplary embodiments can also be combined with one another according to further exemplary embodiments. Alternatively or additionally, the exemplary embodiments shown in the figures can have further features according to the embodiments of the general description.

LIST OF REFERENCE NUMBERS

1 Multi-layer sheet
2 Steel load transmission layer
3 Intermediate binding layer
4 Light metal load transmission layer
5 Adapter component
7 Steel component
8 Light metal component
9 Roll
10 Steel weld seam
11 Light metal weld seam
12 Steel layer thickness
13 Intermediate layer thickness
14 Load layer thickness
15 Layer thickness sum 16 Main body
17 Forming
18 Chip machining The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adapter component for joining two components, comprising:
   a main body formed by a shaped multi-layer sheet, and configured to join two components of a vehicle structure at opposing ends of the main body,
   wherein the multi-layer sheet has at least one steel load transmission layer, an intermediate binding layer and a light metal load transmission layer, and
   wherein the intermediate binding layer is arranged between the steel load transmission layer and the light metal load transmission layer, the intermediate binding layer and the light metal load transmission layer include a light metal, and the light metal load transmission layer has a greater mechanical stability than the intermediate binding layer.

2. The adapter component as claimed in claim 1, wherein the main body has a hollow cylinder shape.

3. The adapter component as claimed in claim 2, wherein the steel load transmission layer is not covered by the intermediate binding layer and/or light metal load transmission layer in a part section adjoining a first opening region of the hollow cylinder shape of the main body.

4. The adapter component as claimed in claim 3, wherein the intermediate binding layer and/or the light metal load transmission layer are not covered by the steel load transmission layer in a part section adjoining a second opening region of the hollow cylinder shape of the main body.

5. The adapter component as claimed in claim 2, wherein the intermediate binding layer and/or the light metal load transmission layer are not covered by the steel load transmission layer in a part section adjoining a second opening region of the hollow cylinder shape of the main body.

6. The adapter component as claimed in claim 1, wherein the light metal load transmission layer has an Al alloy, the intermediate binding layer has modified Al99, and the steel load transmission layer has a special quality steel.

7. The adapter component as claimed in claim 6, wherein the Al alloy is an AlMg3 alloy.

8. The adapter component as claimed in claim 6, wherein the light metal load transmission layer has a silicon content of less than 20% by weight.

9. The adapter component as claimed in claim 1, wherein the light metal load transmission layer has a silicon content of less than 20% by weight.

10. The adapter component as claimed in claim 1, wherein the steel load transmission layer has a steel layer thickness between 0.8 mm and 2.3 mm, and/or the intermediate binding layer together with the light metal load transmission layer has a layer thickness sum between 2.0 mm and 7.0 mm.

11. The adapter component as claimed in claim 10, wherein the layer thickness sum is between 2.0 mm and 5.0 mm.

12. The adapter component as claimed in claim 10, wherein the layer thickness sum is between 2.0 mm and 2.9 mm.

13. The adapter component as claimed in claim 10, wherein a load layer thickness of the light metal load transmission layer is at least twice as thick as an intermediate layer thickness of the intermediate binding layer.

14. A connection assembly, comprising:
   a first component of a vehicle structure, the first component consisting of a first material;
   a second component of the vehicle structure, the second component consisting of a second material; and
   an adapter component configured to join the first component with the second component, the adapter component comprising:
      a main body formed by a multi-layer sheet, wherein the multi-layer sheet has at least one steel load transmission layer, an intermediate binding layer and a light metal load transmission layer, and
      wherein the intermediate binding layer is arranged between the steel load transmission layer and the light metal load transmission layer, the intermediate binding layer and the light metal load transmission layer include a light metal, and the light metal load transmission layer has a greater mechanical stability than the intermediate binding layer.

15. The connection assembly as claimed in claim 14, wherein the first component is a steel component and the second component is a light metal component, and the steel component is joined with the light metal component via the adapter component such that the steel transmission layer of the adapter component is joined with the steel component, and the light metal load transmission layer of the adapter component is joined with the light metal component.

16. The connection assembly as claimed in claim 15, wherein the steel component is welded to the steel load transmission layer of the adapter component, and the light metal component is welded to the light metal load transmission layer of the adapter component.

* * * * *